(12) United States Patent
Seegel et al.

(10) Patent No.: US 10,184,035 B2
(45) Date of Patent: Jan. 22, 2019

(54) SYSTEM AND METHOD FOR PRODUCING COMPOSITE COMPONENT

(71) Applicant: AIRBUS Operations GmbH, Hamburg (DE)

(72) Inventors: Hauke Seegel, Hamburg (DE); Tassilo Witte, Hamburg (DE)

(73) Assignee: Airbus Operations GmbH, Hamburg (DE)

( * ) Notice: Subject to any disclaimer, the term of this patent is extended or adjusted under 35 U.S.C. 154(b) by 202 days.

(21) Appl. No.: 14/526,051

(22) Filed: Oct. 28, 2014

(65) Prior Publication Data
US 2015/0119498 A1 Apr. 30, 2015

(30) Foreign Application Priority Data

Oct. 29, 2013 (EP) .................................. 13190597

(51) Int. Cl.
*B05D 3/12* (2006.01)
*B32B 37/24* (2006.01)
(Continued)

(52) U.S. Cl.
CPC ....... *C08J 5/24* (2013.01); *B05D 3/12* (2013.01); *B29B 15/122* (2013.01); *B29C 70/32* (2013.01);
(Continued)

(58) Field of Classification Search
CPC ..... B29C 70/542; B29C 70/546; B29C 70/32; B29C 70/44; B29C 47/00; B29C 47/64;
(Continued)

(56) References Cited

U.S. PATENT DOCUMENTS 4,292,105 A * 9/1981 Taylor .................. C08J 3/05
156/242
4,356,228 A * 10/1982 Kobayashi ............ B29C 70/025
156/285
(Continued)

FOREIGN PATENT DOCUMENTS

EP       2805802 A1    11/2014
JP    2008028258 A  *  2/2008
(Continued)

OTHER PUBLICATIONS

Machine translation of JP 2008028258 A.*
(Continued)

*Primary Examiner* — Kregg T Brooks
(74) *Attorney, Agent, or Firm* — Jenkins, Wilson, Taylor & Hunt, P.A.

(57) ABSTRACT

A system and method for producing a composite component, especially for continuous production of such composite components, includes a feeding device for feeding one or more layers of reinforcing material from a material supply along a process path, a resin application device for applying a resin matrix to the reinforcing material fed along the process path, and a forming device configured to shape or mould a profile of the reinforcing material and the resin matrix applied thereto to form a composite component as the reinforcing material is fed or conveyed along the process path.

11 Claims, 3 Drawing Sheets

(51) Int. Cl.
  *B32B 38/00*   (2006.01)
  *C08J 5/24*    (2006.01)
  *B29B 15/12*   (2006.01)
  *B29C 70/06*   (2006.01)
  *B29C 70/32*   (2006.01)
  *B29C 70/50*   (2006.01)
  *B29C 70/54*   (2006.01)
  *B64C 1/00*    (2006.01)
  *B64F 5/00*    (2017.01)
  *B29C 70/44*   (2006.01)
  *B29L 31/00*   (2006.01)

(52) U.S. Cl.
  CPC ............ *B29C 70/44* (2013.01); *B32B 37/24* (2013.01); *B32B 38/0012* (2013.01); *B29L 2031/001* (2013.01); *B29L 2031/7739* (2013.01); *B32B 2037/243* (2013.01); *C08J 2331/02* (2013.01); *C08J 2363/00* (2013.01); *C08J 2367/00* (2013.01); *Y02T 50/433* (2013.01); *Y10T 156/1044* (2015.01)

(58) Field of Classification Search
  CPC ............... B29C 47/0071; B29C 43/12; B29C 70/52–70/524; B29C 70/443; C08J 5/24; B29B 15/12–15/127
  See application file for complete search history.

(56) References Cited

U.S. PATENT DOCUMENTS

| | | | |
|---|---|---|---|
| 4,440,593 A | | 4/1984 | Goldsworthy |
| 5,194,190 A | * | 3/1993 | Kim .................. B29C 35/12 |
| | | | 264/258 |
| 5,266,139 A | | 11/1993 | Yokota et al. |
| 6,391,436 B1 | * | 5/2002 | Xu ..................... B29C 70/44 |
| | | | 428/293.4 |

FOREIGN PATENT DOCUMENTS

| | | |
|---|---|---|
| WO | WO 2008/013141 A1 | 1/2008 |
| WO | WO 2009/006247 A2 | 1/2008 |

OTHER PUBLICATIONS

Campbell F C ED—Campbell Flake C: "Manufacturing processes for advanced composites, Pultrusion", Manufacturing Processes for Advanced Composites, Jan. 1, 2004, Elsevier Advanced Technolgy, pp. 432-437, Oxford, GB.

European Search Report for Application No. 13 190 597 dated Apr. 14, 2014.

* cited by examiner

SYSTEM AND METHOD FOR PRODUCING COMPOSITE COMPONENT

CROSS-REFERENCE TO RELATED APPLICATION

This application claims the benefit of and priority to European Patent Application No. 13 190 597.8 filed Oct. 29, 2013, the entire disclosure of which is incorporated by reference herein.

TECHNICAL FIELD

This disclosure relates to a system and method for producing a composite component, and especially a system and method for automated and/or continuous production of a fibre-reinforced composite component.

BACKGROUND

Current manufacturing techniques employed in the production of aircraft and aircraft components do not provide a system or method for the high-volume manufacture of fibre-reinforced composite components having variable geometry and/or variable laminate structures. As a result, the manual effort required to produce such components is significant, and this naturally also leads to substantial costs.

A very recent development, however, the subject of co-pending European Patent Application No. EP 13 168 504.2, provides a system and method for continuous pre-forming of reinforcing material for subsequent inclusion in a composite component. The entire contents of EP 13 168 504.2 are incorporated herein by reference. The present disclosure aims to develop this concept further. That is, an idea of the disclosure is to provide a new and improved system and method for producing fibre-reinforced composite components, particularly for the aircraft or spacecraft industries. In this regard, the system and method of the disclosure can desirably be fully automated and configured for continuous operation.

SUMMARY

In accordance with the present disclosure, a new system for producing composite components and a new method of producing composite components are provided. Preferred features are set out in the dependent claims.

According to one aspect, therefore, the disclosure provides a system for producing composite components, and especially for continuously producing composite components, comprising:
a feeding device for feeding one or more layers of reinforcing material from a material supply along a process path;
a resin application device for applying a resin to the reinforcing material fed along the process path; and
a forming device configured to shape or mould the reinforcing material and the resin applied thereto to form a composite component as the reinforcing material is fed along the process path.

By virtue of the fact that the feeding device may feed one or more layers of reinforcing material from the material supply, the system of the present disclosure can be adapted to various component configurations. That is, the number of layers and the composition of each layer of the reinforcing material can be selected and/or adjusted for flexibility in the production of the composite component. Also, the fact that the layer(s) of reinforcing material and the resin applied thereto are shaped or moulded as they are fed or conveyed along the process path provides for a continuous production process and this, in turn, can enable high-volume manufacture. In other words, the system of the disclosure can generate higher levels of productivity. Importantly, the automated nature of the system also results in consistent handling and processing of the reinforcing material and the resin leading to repeatable production quality in the composite components, as well as reduced costs.

In an embodiment, the resin application device is configured to provide a resin matrix that infuses the reinforcing material. Preferably, the forming device is configured not only to shape the reinforcing material and the resin matrix, but also to at least partially cure the resin matrix to produce the composite component. In this regard, the forming device may include one or more heater for heating and at least partially curing the resin matrix. The one or more heater may include any of a number of different heat sources, such as hot air, induction and/or infrared (IR) heating. The heating may activate hardening of the resin to promote curing of the component. It will be appreciated that the curing could be carried out to completion in the forming device or, alternatively, the composite components could be partially cured in the forming device and then transferred to a curing station to complete the curing procedure.

In an embodiment, the feeding device is configured to feed the expanse of reinforcing material as an elongate, and preferably continuous, strip or sheet in a longitudinal direction along the process path. In this regard the material supply preferably comprises at least one spool, roll or reel of the reinforcing material, which reinforcing material may then be drawn from the material supply as one or more layers of a substantially continuous expanse (e.g. as a compound web or strip or sheet).

In an embodiment, the reinforcing material is in the form of a textile of reinforcing fibres for fibre-reinforced composite components. For example, the textile material may comprise a fibre array or a fabric, such as a woven or non-woven fabric, of any one or more of various different types of reinforcing fibres, including, but not limited to, glass fibres, carbon fibres, aramid fibres, and the like. The fibres are preferably dry, but may include resin or polymer coatings to assist bonding between the layers and/or shaping during production of the component. The resin material is typically a polymer, such as a thermoplastic or thermosetting polymer resin; examples include epoxy resin, polyester resin, vinyl ester resin, and the like. The reinforcing material may typically comprise a plurality of layers of continuous strip or sheet material, which may be drawn from a corresponding plurality of spools, rolls or reels. The individual layers of reinforcing material may be substantially the same or may also differ from one another, i.e. in arrangement and/or in substance, depending upon specific parameters required for the composite component to be produced.

In an embodiment, the feeding device comprises at least one pair of driven rollers for pulling the one or more layers of reinforcing material from the material supply and feeding or conveying the layer(s) along the process path. Thus, the driven rollers may draw a continuous strip or sheet from each of the spools, rolls, or reels of the material supply, and these strips or sheets are then conveyed along the process path superposed with one another as layers of the reinforcing material. In this way, the same driven rollers may draw all of the layers of reinforcing material together to form a compound expanse or textile web, which is then fed or conveyed along the process path.

In an embodiment, the feeding device is configured to feed the reinforcing material as an elongate, and preferably continuous, strip or sheet in a longitudinal direction along the process path. In this regard, the forming device is desirably configured to shape or mould a cross-sectional profile of the composite component; i.e. in a plane transverse to a direction of travel along the process path or a plane transverse to the longitudinal direction of the strip or sheet. The composite component produced is thus preferably elongate with a predetermined cross-sectional profile, as is typical of structural components, such as ribs or stringers, used in a fuselage or airframe of an aircraft or spacecraft.

In an embodiment, the system comprises a cover layer applicator for applying a film or foil layer to cover at least one side of the reinforcing material as it is fed or conveyed along the process path. A film or foil layer may then act as a backing or release layer for the composite component after forming. Thus, an essentially continuous film or foil may be introduced by the cover layer applicator to substantially cover a side of the reinforcing material as it travels along the process path. Indeed, such a film or foil may be introduced on both sides of the expanse of reinforcing material. Each of the films or foils may serve to confine the resin applied to the reinforcing material, and may assist an infusion of the resin matrix into and through the fibres of the reinforcing material. As noted above, each film or foil may also assist a release of the composite component from the forming device, e.g. after the curing procedure is completed. The feeding device is preferably configured to convey or feed the reinforcing material supported on the at least one film or foil layer, which may then act as a backing film or a release film. Preferably, the expanse of reinforcing material and the resin matrix are supported between two films or foils and all are fed or conveyed along the process path together.

In an embodiment, the resin application device is configured to apply the polymer resin as a liquid to the expanse of reinforcing material. In this regard, the resin may be infused or injected directly into contact with the reinforcing material, e.g. via a nozzle. Alternatively, the resin may be made available in a bath and brought into contact with the reinforcing material by feeding or drawing that reinforcing material through the resin bath, e.g. via immersion in the bath; for example, in a pultrusion process. The resin application device may also be configured to apply or introduce the resin between the layers of the reinforcing material, e.g. either as a liquid and/or as one or more solid layer or semi-solid layer, to be infused or impregnated into or through the reinforcing material, e.g. via heating and/or via pressure, to provide a resin matrix. As discussed above, the expanse of reinforcing material is preferably supported on at least one film or foil, which may act as a backing film or a release film. More particularly, both the reinforcing material and the polymer resin applied to it may be supported between two films or foils (e.g. release films), which serve to contain the resin matrix, promote infusion or impregnation of the reinforcing fibres, and enable separation or release of the component from the mould after forming.

In an embodiment, the resin application device is configured to infuse the resin into the fibres of the reinforcing material. To this end, the resin application device may be configured to pressurize the resin applied to the reinforcing material. For example, such pressure may be applied during injection of a liquid resin into contact with the reinforcing material. In another example, pressure may be applied by roller or an inflatable pressure member in contact with an outer surface of the reinforcing material and resin matrix. In a further example, pressure may be applied via a vacuum, so that atmospheric pressure then promotes the resin infusion or impregnation of the reinforcing material. In this regard, a vacuum could be applied between film layers that support or sandwich the reinforcing material and resin matrix between them, and/or a vacuum could be applied between such a film or foil layer and a mould or form of the forming device.

In an embodiment, the resin application device is configured to apply resin to the one or more layers of reinforcing material at or adjacent to the forming device. For example, the resin may be applied immediately upstream of a point at which the reinforcing material enters or contacts the forming device. In this regard, the resin may be applied onto a film or foil, which then forms a backing film or a release film for the component as the reinforcing material enters the forming device. Alternatively, or in addition, the resin application device may be configured to apply resin to the expanse of reinforcing material traveling on the process path upstream of the forming device. In a preferred form, the cover layer applicator described above for applying a film or foil layer over at least one side of the reinforcing material as it is fed or conveyed along the process path may comprise a part of the resin application device, as the applicator can contribute to, or assist in, the infusion of the resin matrix through the reinforcing material.

In an embodiment of the disclosure, the forming device includes a rotary frame having at least one form or mould on a periphery thereof, within or upon which a cross-sectional profile of the composite component is shaped or moulded. The rotary frame may comprise a plurality of forms or moulds arranged around the circumference thereof, and each of the plurality of forms or moulds is preferably separately detachable from the rotary frame. The geometry of a form or mould on the rotary frame can vary from a simple flat shape (i.e. for forming a ring-shaped component) to more complex shapes, such as an inverted V-profile, an L-profile, an Ω-profile, a Z-profile, and many more. The circumference of the rotary frame may thus be arranged on the process path, with the rotary frame configured to rotate at a speed for which a tangential speed of the form or mould on a periphery or circumference of the frame substantially corresponds to the speed at which the expanse of reinforcing material is fed or moves along the process path by the feeding device. Once a component has been finalised or completed to a desired degree in a respective form or mould, that component may be removed from the rotary frame. In this way, the composite component may be removed from the rotary frame while it is still within the form or mould; i.e. the form or mould itself is removed or detached from the frame with the finished component in it. To do so, a cutting unit may be provided to sever or cut the composite component from the continuing extent of reinforcing material and resin matrix still fed within the system. As an alternative, however, a composite component being formed on a continuous basis may be progressively and/or continuously de-moulded or removed from the mould as the rotary frame rotates to effectively provide an "endless" component which is "shed" continually from the mould, e.g. helically, after partial or full curing and is then cut to a desired length.

In an embodiment, the forming device has at least one forming station, and preferably a plurality thereof arranged in series along the process path to shape or mould the cross-sectional profile of the composite component progressively as the reinforcing material is fed or conveyed along the process path. By carrying out a shaping or moulding procedure at a series of forming stations or over a series of steps, the shaping or moulding is performed progressively, and the procedure has flexibility to be varied by adapting one or more of those stations. Thus, in this embodiment, the plurality of forming stations may be arranged in series on or around the circumference of the rotary frame. The forming device and/or each forming station thereof typically acts to pressurize and force the reinforcing material and the resin matrix into the respective mould as the component is formed or shaped.

For example, the forming device and/or each forming station may include one or more rollers (e.g. pinch rollers) which is/are configured for rolling engagement with the resin infused reinforcing material. Thus, the rollers may operate to press the resin impregnated fibres into the mould as the rotary frame revolves; that is, in a corresponding manner to that described in EP 13 168 504.2. In an alternative, a vacuum may be applied at the forming station to press the reinforcing material and the resin matrix into the respective mould. In this regard, an inner region or a liner of each mould may be formed from a flexible material like thermal expansion rubber as a good option for even pressure exertion. The mould will desirably also have an integrated heating system for curing the resin matrix during and/or after the forming or shaping procedure. A flexible (e.g. rubber-type) mould liner may also facilitate de-moulding or removal of the composite component from the mould, e.g. after curing.

Another technique for pressing the reinforcing material and resin matrix into a respective mould includes tensioning or pulling an outer backing or release film against a direction of rotation of the rotary frame. A further technique may involve applying hydrostatic pressure within a mould cavity, e.g. via an inflatable pressure member such as a bladder or tube. For example, a flat chain belt may close a mould cavity with an inflatable tube extending within it, whereby the tube may then be inflated to apply pressure to the resin matrix and the reinforcing material held in the mould. In another example, solid or flexible tooling segments could be set on a vacuum foil, and then pressure applied with the aid of a vacuum. The forming procedure should be carried out or performed carefully to avoid weak spots in a component resulting from the reinforcing fibre material not being fully infused or impregnated by the polymer resin.

In an embodiment, the system may further include a preliminary forming station in the process path comprising a mould or form in or upon which a cross-sectional profile of the expanse or web of fibre reinforcing material may undergo preliminary shaping or moulding before that material reaches the forming device.

In an embodiment of the disclosure, the system may further comprise a laying device for laying or inserting a discrete or non-continuous section of reinforcing material on or between the one or more layers fed along the process path. The laying device may therefore be used to add discrete and localised sections or portions of reinforcing material at specific critical positions, depending on the component requirements. To this end, the laying device may comprises a transport head for picking-up, transporting, and laying or inserting the discrete or non-continuous section on or between the one or more layers. Desirably, therefore, the system also includes a consolidating device for consolidating or compressing or pressing together the one or more layers of reinforcing material and/or a discrete or non-continuous section laid or inserted therein as they are fed along the process path. For this purpose, the consolidating device may include rollers, between which the layers and/or discrete sections of reinforcing material are consolidated or compressed.

According to another aspect, the present disclosure provides a method of producing a composite component, and especially of continuously producing composite components, for an aircraft or spacecraft, comprising:
feeding or conveying one or more layers of reinforcing material from a material supply along a process path;
infusing a polymer resin into the reinforcing material fed along the process path to provide a resin matrix; and
forming or shaping the reinforcing material and the resin matrix infused thereto to form a composite component as the reinforcing material is fed along the process path.

In an embodiment, the infusing comprises impregnating or pressing the polymer resin into the reinforcing material. To this end, a vacuum-induced pressure (e.g. atmospheric pressure) may be applied to the polymer resin to effect the impregnating or pressing. In this regard, for example, the method may include:
applying polymer resin to the reinforcing material fed along the process path between two films or foils; and
applying a vacuum to a space between the two films or foils thereby to press the polymer resin into the reinforcing material.

In an embodiment, the forming or shaping includes pressing and/or pressurizing the reinforcing material and the resin matrix applied thereto in a mould or form as the layer(s) of reinforcing material is/are fed along the process path. To this end, the pressing or pressurizing of the reinforcing material and the resin matrix in the mould or form may include one or more of rolling pressure, vacuum-induced (e.g. atmospheric) pressure, tensioning or pulling an outer film or foil against a direction of rotation of the rotary frame, hydrostatic pressure with the mould, e.g. via an inflatable pressure member, and/or pressure through solid or flexible tooling segments, e.g. on a vacuum foil.

In an embodiment, the method further includes at least partially curing the resin matrix to produce the composite component. The curing is desirably carried out during and/or after the forming or shaping the reinforcing material and the resin applied thereto. In this regard, the curing preferably includes heating the resin and the layer(s) of reinforcing material within a respective mould or form. For example, depending on the resin employed, the curing may include heating the resin matrix to a temperature in the range of 150° C. to 250° C., and preferably in the range of 170° C. to 200° C. (e.g. about 180° C.), for a period in the range of about 10 minutes to 90 minutes. One or more heating elements may be incorporated in the respective mould or form containing the resin and the reinforcing material for heating the resin matrix during the curing. For example, electric heating elements may provide conduction heating. In an alternative, or in addition, one or more heating elements may be arranged outside of the respective mould or form for heating the resin matrix, e.g. by radiation and/or by forced convection, during the curing.

In an embodiment, the feeding includes feeding each layer of reinforcing material as an elongate, preferably continuous, strip or sheet in a longitudinal direction along the process path, whereby the forming comprises shaping or moulding a cross-sectional profile of the strip or sheet of reinforcing material in a plane generally transverse to that longitudinal direction.

In an embodiment, the forming includes a number of discrete forming operations carried out in series along the process path to progressively shape or mould the cross-sectional profile of the reinforcing material as the one or more layers are fed along the process path. In this regard, the forming may include shaping or moulding the cross-sectional profile of the reinforcing material and the resin matrix around or on a periphery of a rotary frame. Thus, the rotary frame preferably rotates with a tangential speed at a circumference thereof substantially equal to a speed at which the reinforcing material is fed in the feeding. The rotary frame preferably includes one or more forms or moulds arranged around the circumference thereof, and each of the forms or moulds may be separately detachable from the rotary frame.

The material supply may include at least one spool, roll or reel of reinforcing material and the feeding comprises drawing the one or more layers of reinforcing material from the material supply and feeding or conveying them along the process path by driving at least one pair of rollers. That is, the one or more layers of reinforcing material are drawn between the driven rollers and fed along the process path.

The method may further comprise laying or inserting a discrete or non-continuous section of reinforcing material on or between the one or more layers of reinforcing material fed along the process path. The method preferably also includes consolidating or pressing together the one or more layers of reinforcing material and/or the discrete or non-continuous section of reinforcing material fed along the process path, for example via rollers.

The method may comprise a preliminary forming in which the cross-sectional profile of the one or more layers of reinforcing material undergoes a preliminary shaping or moulding before the one or more layers reach the forming device. In this preliminary forming, the cross-sectional profile of the one or more layers of the reinforcing material is desirably shaped or moulded in a plane transverse to the travel direction or the longitudinal direction.

The system and method of the present disclosure thus allow the manual effort previously required in the production of fibre-reinforced composite components that have a variable geometry and/or variable laminate structures to be markedly reduced by new production techniques that can operate continuously and largely or fully automated. This, in turn, can substantially reduce the production costs, enable high-volume manufacture, and also increase quality and repeatability of the composite component and component production. As will be apparent from the description of the embodiments, both the system and method of this disclosure particularly lends themselves to production of elongate composite components having a specific cross-section or profile for structural applications.

According to a further aspect, the present disclosure provides a fibre-reinforced composite component, especially for use in an aircraft or spacecraft, which is produced with a system or method according to any of the embodiments of the disclosure described above.

According to still another aspect, the disclosure may provide a vehicle, such as an aircraft or spacecraft, incorporating one or more such fibre-reinforced composite component.

BRIEF DESCRIPTION OF THE DRAWINGS

For a more complete understanding of the disclosure and the advantages thereof, exemplary embodiments of the disclosure are explained in more detail in the following description with reference to the accompanying drawing figures, in which like reference characters designate like parts and in which.

The accompanying drawings are included to provide a further understanding of the present disclosure and are incorporated in and constitute a part of this specification. The drawings illustrate particular embodiments of the disclosure and together with the description serve to explain the principles of the disclosure. Other embodiments of the disclosure and many of the attendant advantages of the disclosure will be readily appreciated as they become better understood with reference to the following detailed description.

It will be appreciated that common and well understood elements that may be useful or necessary in a commercially feasible embodiment are not necessarily depicted in order to facilitate a more abstracted view of the embodiments. The elements of the drawings are not necessarily illustrated to scale relative to each other. It will further be appreciated that certain actions and/or steps in an embodiment of a method may be described or depicted in a particular order of occurrences while those skilled in the art will understand that such specificity with respect to sequence is not necessarily required. It will also be understood that the terms and expressions used in the present specification have the ordinary meaning as it accorded to such terms and expressions with respect to their corresponding respective areas of inquiry and study, except where specific meanings have otherwise been set forth herein.

DETAILED DESCRIPTION

Figure 1:
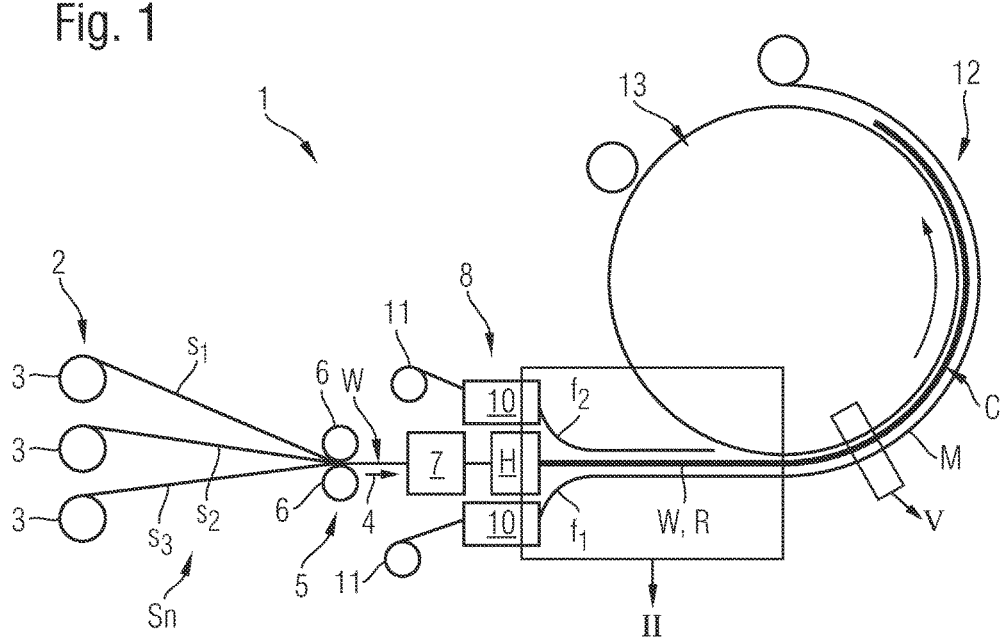
FIG. 1 is a schematic side view of a system for producing composite components according to an embodiment of the disclosure.

With reference to FIG. 1 of the drawings, a system 1 for producing a composite component C according to a preferred embodiment of the disclosure is illustrated schematically in operation. The system 1 of this embodiment is designed for continuously producing fibre-reinforced composite components and includes a supply 2 of reinforcing material, which is provided in the form of continuous strips or sheets Sn of woven or non-woven fabric on rolls or reels 3, which are held or mounted rotatably on a support frame of the system 1. That is, the strips or sheets s1, s2, s3 are continuous webs of material which are drawn from respective individual rolls or reels 3 in the material supply 2 and consolidated into a compound web W. In other words, the compound web W comprises a plurality of layers Sn of reinforcing material superposed upon one another and conveyed along a process path 4 of the system 1.

To this end, the system 1 includes a feeding device 5 which may comprise a pair of rollers 6 driven by an electric motor. The rollers 6 engage the web W comprising multiple layers of reinforcing material at upper and lower sides thereof and act to both draw these layers s1, s2, s3 from their respective rolls or reels 3 in the material supply 2 and also to feed or convey these layers in the compound web W along the process path 4 through the system 1. The separate layers Sn of the reinforcing material may include one or more types of fibres, but carbon fibres are preferred. The fibres may be "dry" or may include resin or polymer coatings to assist bonding and shaping in production of the component. Further, the web W of reinforcing material may also include a wire mesh layer for lightning protection in aircraft applications. The driven rollers 6 of the feeding device 5 typically pull or draw the web W of reinforcing material through a consolidating device, and more particularly between rollers that are resiliently or spring biased towards one another, such that they act to consolidate or compress the layers Sn of the reinforcing material into the compact compound web W, which then passes into an optional preliminary forming device 7 arranged on the process path 4 of the system 1.

As discussed in detail in EP 13 168 504.2, the preliminary forming device 7 may be associated with a heating device for heating the compound web W of reinforcing material from upper and/or lower sides, respectively, to rapidly transmit heat to the middle of the web W. For example, heating units (not shown) may comprise infrared (IR) heaters, which operate at a constant 190° C. and, from a starting temperature of the web at approx. 25° C., the temperature of the middle layers rises to about 100° C. after a heating period of between about 30 s and 120 s, preferably between about 40 s and 90 s. A preliminary forming procedure for the web W of reinforcing material is not illustrated here, but the preliminary forming station 7 typically comprises a mould or form upon or over which a cross-sectional profile of the compound web W of reinforcing material undergoes initial shaping or moulding. For example, the substantially flat or planar web W of reinforcing fibres may be pressed or folded over an up-standing form to generate an inverted V- or U-shape. Alternatively, the preliminary forming device 7 in FIG. 1 may provide a much smaller or more limited indentation in a central region of the web W, or could even be flat.

Figure 2:
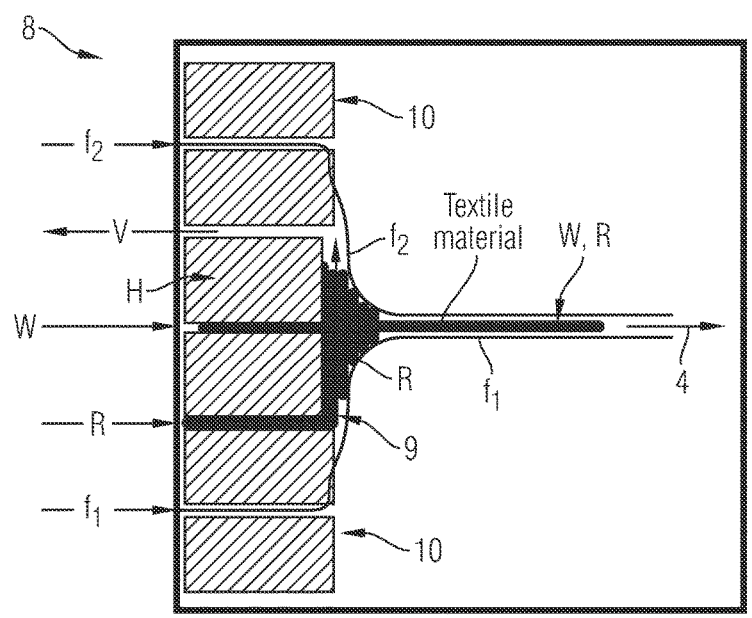
FIG. 2 is a schematic side view of detail region II in the system of FIG. 1.

Referring also now to FIG. 2 of the drawings, a region II in the system 1 of FIG. 1 downstream of the optional preliminary forming device 7 corresponds to a resin application device 8 of this embodiment. The resin application device 8 includes a housing H through which the web W of reinforcing material is conveyed or fed along the process path 4 and at least one nozzle arrangement 9 for injecting the polymer resin R in liquid form into direct contact with the web W of reinforcing material as it travels along the process path. To assist with infusion of the polymer resin R into the fibres of the web W to form a resin matrix of the composite component C to be produced, the resin application device 8 includes two film applicators 10 for feeding a resin-impervious film f in a continuous strip or sheet as a cover film or backing film on each of the upper and lower sides of the reinforcing web W. In particular, each of the film applicators 10 includes a roll or reel 11 of a film or foil f1, f2 (e.g. plastic film) in a continuous strip or sheet, which is fed and conveyed respectively covering a lower side and an upper side of the reinforcing material web W as it is conveyed or travels along the process path 4.

As can be seen in FIG. 2, therefore, the liquid resin R is injected via the nozzle arrangement 9 into contact with the reinforcing web W and the resin R is contained between the two cover films or backing films f1, f2. At the same time, one or more vacuum ports V are provided in the housing H for generating an under-pressure between the two films f1, f2 so that they are then pressed by external (i.e. atmospheric) pressure into intimate contact with the injected resin R over the web W. This, in turn, promotes full or thorough infusion of the resin matrix through the fibre layers s1, s2, s3 of the reinforcing web W and any excess resin R may also be removed via the vacuum port(s) V. In this way, the web W and the resin matrix R injected into the web are conveyed between the upper and lower backing films f1, f2 to a forming device 12 of the system 1 for shaping or moulding a profile of the component C to be produced. The forming device 12 comprises a rotary frame 13, which is shown schematically in FIG. 1 and FIG. 3 of the drawings as a large circle or wheel and is described in more detail below. In this connection, reference is again also made to the detailed description of the forming device and rotary frame in EP 13 168 504.2.

Figure 3:
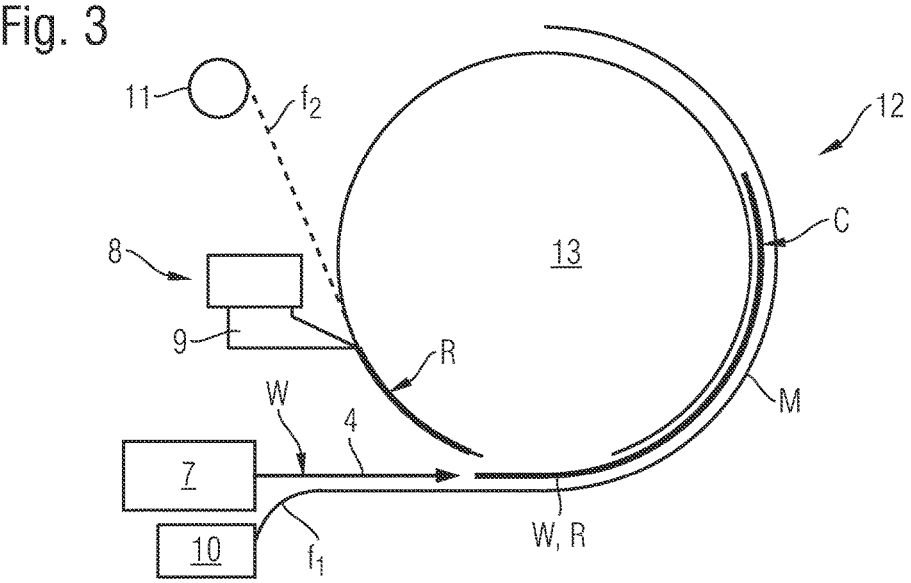
FIG. 3 is a schematic side view of a resin application device in a system according to another embodiment of the disclosure.

With reference to FIG. 3 of the drawings, a resin application device 8 according to a modified embodiment of the disclosure is illustrated. In this case, a single film applicator 10 of the type shown in FIGS. 1 and 2 is provided for applying a backing film f1 to the web W of reinforcing material on one side (i.e. a lower side) thereof, while the upper side of the web W remains uncovered. The resin application device 8 of this embodiment again includes a nozzle arrangement 9 for introducing or injecting the polymer resin R, but this time the nozzle(s) 9 is/are position to apply the resin R directly onto the rotary frame 13 of the forming device 12. In this regard, a second backing film f2 is provided to cover the rotary frame, and a nozzle 9 of the resin applicator 8 then injects a stream of the polymer resin R onto the film f2 covering the rotating rotary frame 13. In this way, a layer or stream of resin material R is carried down on the frame 13 into contact with the web W of reinforcing material as the web is conveyed on the process path 4 to the rotary frame 13. In this way, the liquid resin R and web W are again held or contained between two cover films or backing films f1, f2 as the layers of reinforcing material reach the rotary frame 13. Furthermore, the tension in these films, particularly in the lower film f1, as it extends around the rotary frame 13 may exert radial inward pressure promoting a complete infusion of the liquid resin R through the fibres of the reinforcing web.

Figure 4:
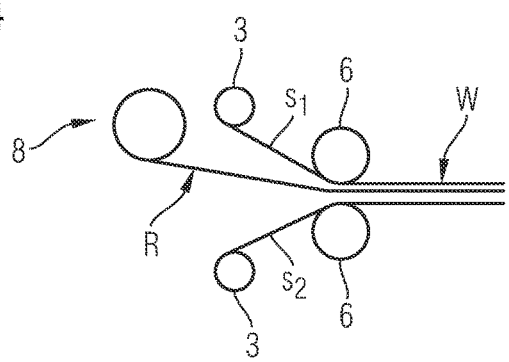
FIG. 4 is a schematic side view of a resin application device in a system of a further embodiment of the disclosure.

FIG. 4 of the drawings schematically shows another possible embodiment of the resin application device 8 in a system 1 according to this disclosure. In this embodiment, the resin material R may be provided in a non-liquid state (i.e. in a solid or semi-solid state) in the form of a layer or sheet of resin material R, especially cooled resin. The layer or sheet of resin R is provided on a roll and is fed or conveyed by the feeding device 5 between individual layers s1, s2 of the reinforcing material of web W. As the web W then continues along the process path 4, the layer of resin material R may be heated by one or more heating device (not shown) of the system 1 to soften the resin R and assist its infusion into and through the reinforcing fibre layers s1, s2. To this end, pressure may also be exerted on the softened resin layer R by applying cover films or backing films f1, f2 and evacuating a space between those films f1, f2 as described with reference to FIG. 2 above, such that atmospheric pressure then promotes infusion of the resin R through the fibre layers s1, s2.

Figure 5:
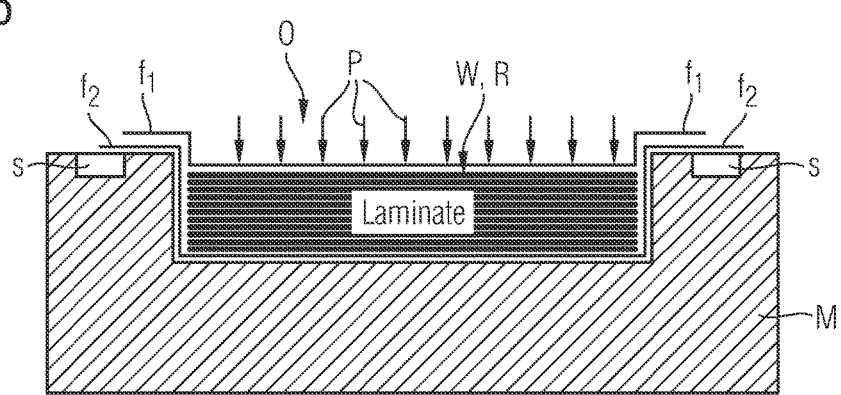
FIG. 5 is a schematic side view of detail region V in the system of FIG. 1.

With reference again to FIG. 1 of the drawings, the rotary frame 13 of the forming device 12 rotates with a peripheral speed essentially corresponding to a speed of the layers Sn of reinforcing material as they are fed or conveyed along the process path 4. An outer periphery of the rotary frame 13 includes a number of moulds M into which the reinforcing web W and its resin matrix R are guided by the process path 4. In particular, the reinforcing web W and resin matrix R held and supported between the cover films f1, f2 are pressed into a respective mould M by a combination of tension forces in the web W and/or the cover films f1, f2 as well as by additional mechanisms for exerting pressure, such as rollers (e.g. pinch rollers) or hydrostatic (e.g. inflatable) pressure members. As a result, the layers s1, s2, s3 of reinforcing material making up the web W and the resin matrix R carried between the two films f1, f2 are pressed (i.e. in the direction of arrows P shown in FIG. 5) into a continuous moulding cavity O in the moulds M provided around a periphery of the rotary frame 13. In particular, FIG. 5 shows a cross-section of the mould cavity O at the region V of the forming device 12 shown in FIG. 1. In this instance, the moulding cavity O provides a simple and substantially flat shape, but more complex forms, such as a V-profile, an Ω-profile, an L-profile or a Z-profile may also be contemplated. Edge regions of each of the upper and lower backing films f1, f2 may be fixed and sealed along seals S shown schematically on an outer surface of the respective mould M along sides of the mould cavity O to prevent unwanted escape or egress of the resin R during moulding or shaping under the application of pressure P.

Heating elements (not shown) are typically provided in the forming device 12 for curing the polymer resin R (e.g. in the case of a thermosetting resin) as the rotary frame 13 of the forming station 12 rotates. In this regard, the heating elements may be incorporated in the moulds M themselves so that heat is conductively transmitted through the body of the mould M into the moulding cavity O. Alternatively, or in addition, heating elements may be provided along the process path 4 adjacent to the moulding cavities O for infrared (IR) heating and/or radiation heating of the component C in the mould cavity. As will be appreciated by persons skilled in the art, the desired curing time and curing temperature will vary depending upon the particular resin R employed, the power and performance of the heating elements provided, and parameters and dimensions of the component C itself being produced. As an example, however, the curing could take place at a temperature of about 180° C. for a period of about 30 to 60 minutes. Thus, in this curing period, the rotary frame 13 might complete a half-rotation or a full rotation.

Figure 6:
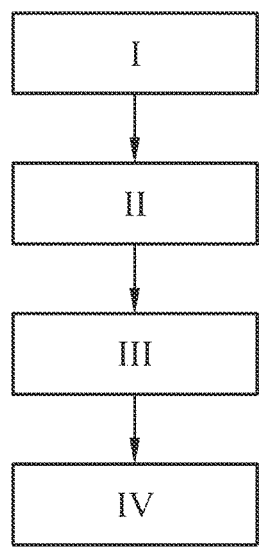
FIG. 6 is a diagram that illustrates a method of producing a component according to an embodiment of the disclosure.

Referring now to FIG. 6 of the drawings, a flow diagram is shown that schematically illustrates the steps in a method of continuously producing composite components C for an aircraft according to an embodiment of the disclosure described above with respect to FIGS. 1 to 5. In this regard, the first box I of FIG. 6 represents the step of feeding or conveying one or more layers Sn of reinforcing material as an elongate sheet or strip W from a material supply 2 along a process path 4. The second box II then represents the step of applying and infusing a polymer resin R into the layer(s) of reinforcing material fed or conveyed along the process path 4 to provide a resin matrix R for that reinforcing material. The third box III represents the step of forming or shaping a profile of the reinforcing material and resin matrix R infused therein in a mould M of the forming device 12 to form the composite component C as the reinforcing material is fed or conveyed along the process path 4. The final box IV in FIG. 6 of the drawings represents the step of curing the resin matrix R in the mould M to produce the composite component C, wherein the curing step is performed or carried out during and/or after or directly following the forming or shaping step.

Figure 7:
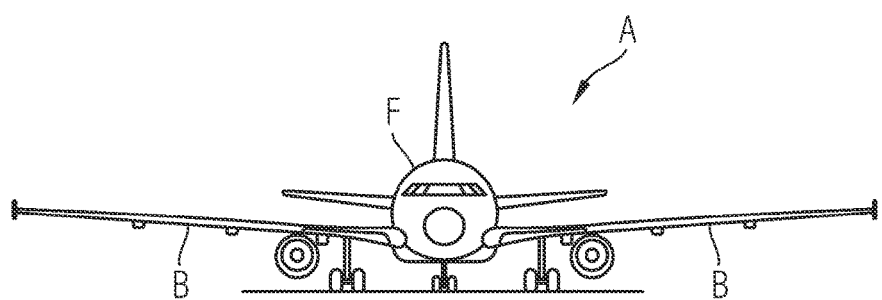
FIG. 7 is a schematic front view of an aircraft including one or more structural component based on a preform produced by the system or method of the disclosure.

As noted above, the composite components C produced with the system 1 and method of the disclosure may be configured for use as structural components, such as stringers and/or ribs, in the aeronautical or aerospace industry. As an example, FIG. 7 of the drawings shows an aircraft A with a fuselage or airframe structure F and wings B that may incorporate such composite components C.

Although specific embodiments of the disclosure have been illustrated and described herein, it will be appreciated by those of ordinary skill in the art that a variety of alternate and/or equivalent implementations exist. It should be appreciated that the exemplary embodiment or exemplary embodiments are only examples, and are not intended to limit the scope, applicability, or configuration in any way. Rather, the foregoing summary and detailed description will provide those skilled in the art with a convenient road map for implementing at least one exemplary embodiment, it being understood that various changes may be made in the function and arrangement of elements described in an exemplary embodiment without departing from the scope as set forth in the appended claims and their legal equivalents. Generally, this application is intended to cover any adaptations or variations of the specific embodiments discussed herein.

In this document, the terms "comprise", "comprising", "include", "including", "contain", "containing", "have", "having", and any variations thereof, are intended to be understood in an inclusive (i.e. non-exclusive) sense, such that the process, method, device, apparatus or system described herein is not limited to those features or parts or elements or steps recited but may include other elements, features, parts or steps not expressly listed or inherent to such process, method, article, or apparatus. Furthermore, the terms "a" and "an" used herein are intended to be understood as meaning one or more unless explicitly stated otherwise. Moreover, the terms "first", "second", "third", etc. are used merely as labels, and are not intended to impose numerical requirements on or to establish a certain ranking of importance of their objects.

The invention claimed is:

1. A system for continuous production of a composite component, comprising:
   a feeding device for feeding a plurality of layers of reinforcing material from a material supply as elongate strip or sheet along a process path;
   two cover layer applicators for applying two film or foil layers to cover both sides of the reinforcing material as the reinforcing material is fed or conveyed along the process path;
   a resin application device comprising the two cover layer applicators and a nozzle for applying a resin to the reinforcing material fed along the process path in liquid form to provide a resin matrix;
   a forming device configured to shape or mould a profile of the reinforcing material and the resin matrix to form the composite component as the reinforcing material is fed along the process path; and
   one or more vacuum port for generating an under-pressure between the two film or foil layers as the reinforcing material is fed or conveyed along the process path so that the layers are pressed by external pressure into contact with the resin over the reinforcing material,
   wherein the reinforcing material and the resin matrix are supported between and covered by the two film or foil layers and the resin is injected into contact with the reinforcing material via the nozzle.

2. The system according to claim 1, wherein the forming device is configured to form and to at least partially cure the resin matrix to produce the composite component.

3. The system according to claim 1, wherein the feeding device is configured to feed the plurality of layers of reinforcing material as an elongate strip or sheet in a longitudinal direction along the process path, wherein the forming device is configured to shape or mould a cross-sectional profile of the composite component transverse to the longitudinal direction, wherein the forming device includes a rotary frame having at least one form or mould on a periphery thereof in or upon which a cross-sectional profile of the component is shaped or moulded.

4. The system according to claim 3, wherein the rotary frame comprises a plurality of forms or moulds arranged around the circumference thereof, and wherein the plurality of forms or moulds are separately detachable from the rotary frame.

5. The system according to claim 1, wherein the resin application device is configured to apply the resin at or adjacent to the forming device, whereby the resin is applied immediately upstream of a point at which the reinforcing material contacts the forming device on at least one film or foil.

6. The system according to claim 5, wherein the resin is applied between two film layers.

7. The system according to claim 1, wherein the resin application device is configured to apply the resin to the reinforcing material upstream of the forming device.

8. A method for continuous production of a composite component, for an aircraft or spacecraft, comprising:
   feeding a plurality of layers of reinforcing material from a material supply as elongate strip or sheet along a process path;
   applying film or foil layers to two sides of the reinforcing material as the reinforcing material is fed or conveyed along the process path;
   infusing a polymer resin into the reinforcing material fed or conveyed along the process path to provide a resin matrix;
   forming or shaping a profile of the reinforcing material and resin matrix infused thereto to form a composite component as the reinforcing material is fed or conveyed along the process path;
   applying the polymer resin to the reinforcing material fed along the process path between a pair of film or foil layers; and
   applying a vacuum to a space between the pair of film or foil layers as the reinforcing material is fed or conveyed along the process path to press the polymer resin into the reinforcing material,
   wherein the resin is applied between the film or foil layers as a liquid via a nozzle.

9. The method according to claim 8, further comprising:
   at least partially curing the resin matrix to produce the composite component, wherein the curing is performed or carried out during and/or directly following the forming or shaping.

10. The method according to claim 9, comprising fully curing the resin matrix to produce the composite component.

11. The method according to claim 8, wherein the forming or shaping includes pressing the layers of reinforcing material and the resin matrix into a form or mould by any one or more of an inflatable pressure member or vacuum-assisted pressure application or at least one roller member.

* * * * *